United States Patent

Shiell et al.

[11] Patent Number: 6,108,775
[45] Date of Patent: *Aug. 22, 2000

[54] DYNAMICALLY LOADABLE PATTERN HISTORY TABLES IN A MULTI-TASK MICROPROCESSOR

[75] Inventors: Jonathan H. Shiell; George Z. N. Cai, both of Plano, Tex.

[73] Assignee: Texas Instruments Incorporated, Dallas, Tex.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/999,434

[22] Filed: Dec. 29, 1997

Related U.S. Application Data

[60] Provisional application No. 60/034,397, Dec. 30, 1996.

[51] Int. Cl.$^7$ ........................................... G06F 15/00
[52] U.S. Cl. ..................... 712/240; 712/240; 712/233; 712/32
[58] Field of Search .................................... 712/228, 229, 712/230, 231, 244, 23, 811, 233–240, 1–43, 200–232, 241–248, 30 D; 395/569, 570, 571, 572, 591, 800.23, 800.43, 676, 677, 678; 709/7–9

[56] References Cited

U.S. PATENT DOCUMENTS

| 5,574,871 | 11/1996 | Hoyt et al. | 712/200 |
| 5,577,217 | 11/1996 | Hoyt et al. | 712/200 |
| 5,935,241 | 8/1999 | Shiell | 712/240 |

OTHER PUBLICATIONS

Rosenberg, Jerry M., "Dictionary of computers, information processing & telecommunications", John Wiley & sons, p. 636, 1987.

Micro–28, International Symposium on Microarchitecture, Brad Calder, et al. Nov. 29–Dec. 1, 1995, Ann Arbor, Michigan.

ACM Sigarch, The 19$^{th}$ Annual Inter. Symposium on Computer Architecture News, vol. 20, #2, May 1992.

Micro–24 Two–Level Adaptive Training Branch Prediction, Tse–Yu Yeh, et al. Department of Electrical Engineerring and Computer Science, The University of Michigan, Ann Arbor, Michigan.

Intel, Pentium Pro Family Developer's Manual, vol. 3: Operating System Writer's Guide.

*Primary Examiner*—Meng-Ai T. An
*Assistant Examiner*—Stacy Whitmore
*Attorney, Agent, or Firm*—Frederick J. Telecky, Jr.; Rebecca Mapstone Lake

[57] ABSTRACT

A microprocessor (10) and a system (300) incorporating the same is disclosed, in which branch prediction is effected in response to the type of program in which branching instructions are contained. A fetch unit (26) includes a branch target buffer (56) and a plurality of pattern history tables (53). Select logic (80) receives signals indicating, for each branching instruction, the type of program containing the instruction, and selects one of the pattern history tables (53) for use in generating a prediction code in response to a portion of a branch history field (BH) in an entry (63) of the branch target buffer (56) corresponding to the instruction address. Disclosed examples of the signals used in selecting the pattern history table (53) include an indication (U/S) of the privilege level (e.g., user-level or supervisor-level) of the instruction. In the event of a task switch, the contents of one or more of the pattern history tables (53) may be stored in the task state segment (90) corresponding to an interrupted task, with the pattern history tables (53) loaded with entries from the task state segment (90) of the new task. In this way, each task may maintain its own branch pattern history-based prediction information when microprocessor (10) is operated in a multitasking environment.

32 Claims, 4 Drawing Sheets

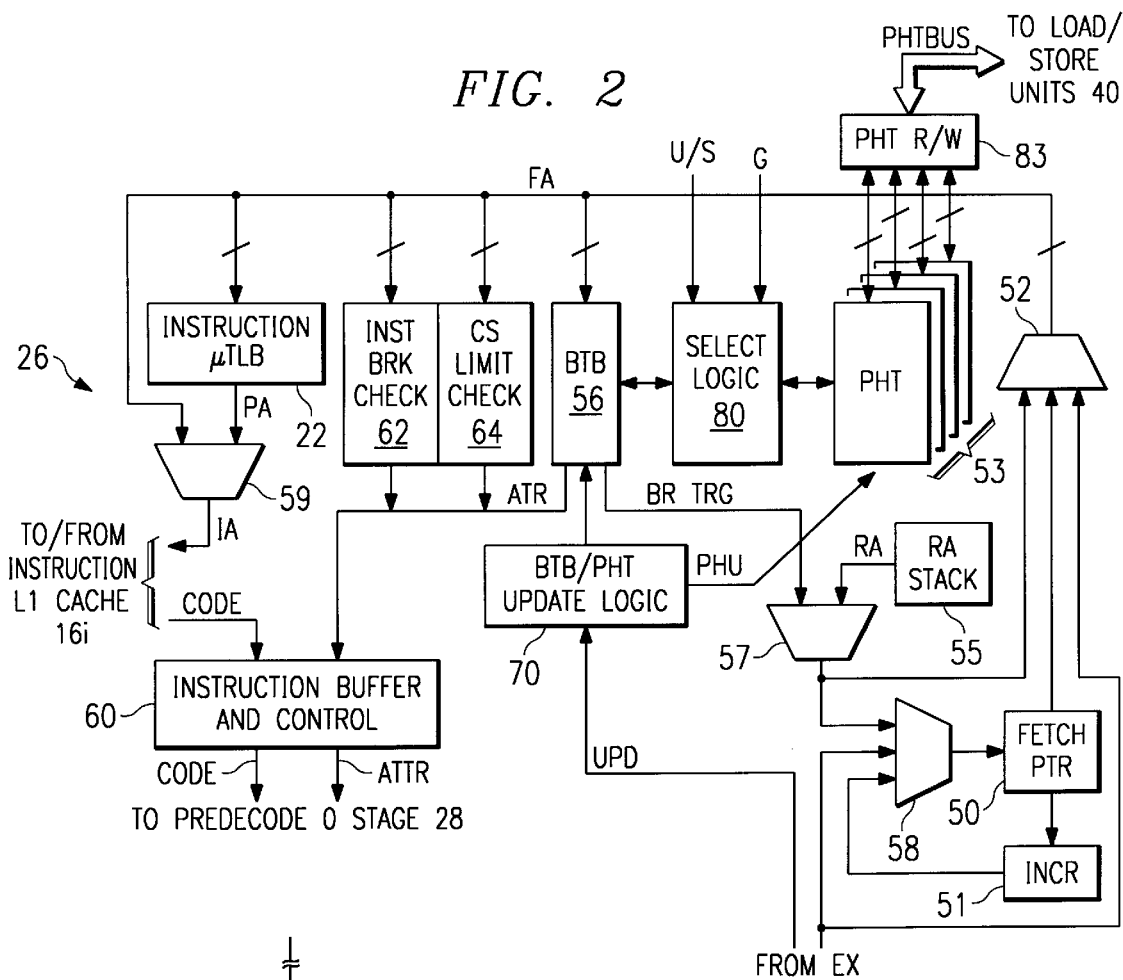
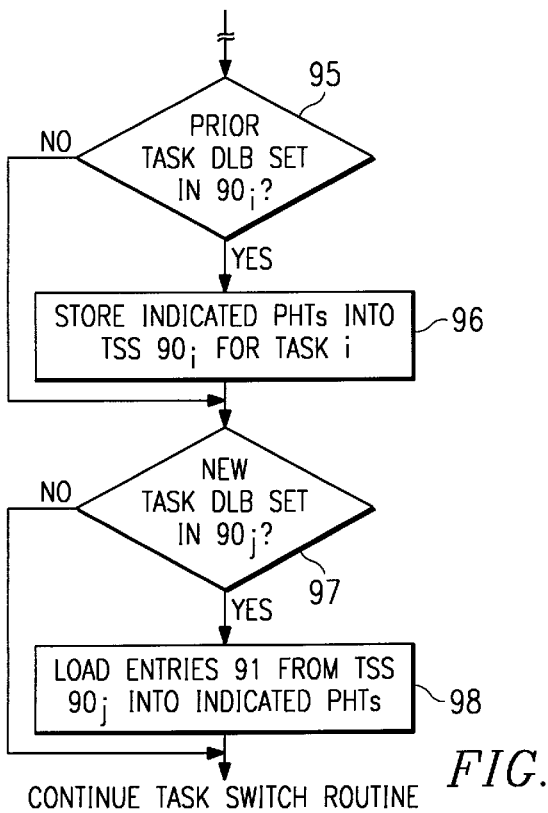

| | | | |
|---|---|---|---|
| 91₃ | PHT 53₃ | | +29 |
| 91₂ | PHT 53₂ | | +28 |
| 91₁ | PHT 53₁ | | +27 |
| 94 | PHT AREA BASE | N/U | DLB | +26 |
| | I/O MAP BASE | N/U | T | +25 |
| | N/U | TASK LDT SELECTOR | |
| | N/U | GS SELECTOR | +23 |
| | N/U | FS SELECTOR | +22 |
| | N/U | DS SELECTOR | |
| | N/U | SS SELECTOR | |
| | N/U | CS SELECTOR | |
| | N/U | ES SELECTOR | |
| | EDI | | |
| | ESI | | |
| | EBP | | |
| | ESP | | |
| | EBX | | |
| | EDX | | |
| | ECX | | |
| | EAX | | |
| | EFLAG | | |
| | EDI | | |
| | CR3 (PDBR) | | |
| | N/U | SS FOR CPL2 | |
| | ESP FOR CPL2 | | |
| | N/U | SS FOR CPL1 | |
| | ESP FOR CPL1 | | |
| | N/U | SS FOR CPL0 | |
| | ESP FOR CPL0 | | |
| | N/U | BACK LINK TO PRIOR TSS | |

92 points to offset +26 (DLB field). WORD OFFSET FROM TSS BASE shown on right. 90 labels the overall TSS. BASE at bottom. Bit positions: 31, 16, 15, 0.

*FIG. 4*

DYNAMICALLY LOADABLE PATTERN HISTORY TABLES IN A MULTI-TASK MICROPROCESSOR

CROSS-REFERENCE TO RELATED APPLICATIONS

This application claims the benefit of U.S. Provisional No. 60/034,397 filed Dec. 30, 1996.

BACKGROUND OF THE INVENTION

This invention is in the field of microprocessors, and is more specifically directed to branch prediction techniques in pipelined microprocessors.

In the field of microprocessors and other programmable logic devices, many improvements have been made in recent years which have resulted in significant performance improvements. One such improvement is the implementation of pipelined architectures, in which multiple microprocessor instructions are processed simultaneously along various stages of execution, so that the processing of subsequent instructions begins prior to the completion of earlier instructions. Because of pipelining, the effective rate at which instructions are executed by a microprocessor can approach one instruction per machine cycle in a single pipeline microprocessor, even though the processing of each individual instruction may require multiple machine cycles from fetch through execution. So-called superscalar architectures effectively have multiple pipelines operating in parallel, providing even higher theoretical performance levels.

Of course, as is well known in the art, branching instructions are commonplace in most conventional computer and microprocessor programs. Branching instructions are instructions that alter the program flow, such that the next instruction to be executed after the branching instruction is not necessarily the next instruction in program order. Branching instructions may be unconditional, such as JUMP instructions, subroutine calls, and subroutine returns. Some branching instructions are conditional, as the branch depends upon the results of a previous logical or arithmetic instruction.

Conditional branching instructions present complexity in microprocessors of pipelined architecture, because the condition upon which the branch depends is not known until execution, which may be several cycles after fetch. In these situations, the microprocessor must either cease fetching instructions after the branch until the condition is resolved, introducing a "bubble" of empty stages (i.e., potential instruction processing slots) into the pipeline, or must instead speculatively fetch an instruction (in effect guessing the condition) in order to keep the pipeline full, at a risk of having to "flush" the pipeline of its current instructions if the speculation is determined to be incorrect.

The benefit of speculative execution of instructions in keeping the pipeline full, particularly in architectures with long or multiple pipelines, typically outweighs the performance degradation of pipeline flushes, so long as the success rate of the speculative execution is sufficient to achieve the desired performance benefit. Many modern microprocessors therefore follow some type of branch prediction techniques by way of which the behavior of conditional branching instructions may be predicted with some accuracy. One type of branch prediction is referred to as "static" prediction, as the prediction does not change over time or history. A simple static prediction approach merely predicts all conditional branches to be "taken". An improved static branch prediction approach predicts according to branch direction, for example by predicting all conditional branches in the forward direction to be "not taken" and predicting all conditional backward branches (e.g., LOOP instructions in DO loops) to be "taken". Of course, unconditional branches may always be statically predicted as "taken".

Dynamic branch prediction refers to a known technique of branch prediction that uses the results of past branches to predict the result of the next branch. A simple well-known dynamic prediction technique merely uses the results of the most recent one or two conditional branching instructions to predict the direction of a current branching instruction.

A more accurate dynamic branch prediction approach predicts the direction of a branching instruction by its own branching history, as opposed to the branch results of other instructions. This approach is generally incorporated into modern microprocessors by way of a branch target buffer. A conventional branch target buffer, or BTB, is a cache-like table of entries that each store an identifier (a "tag") for recently-encountered branching instructions, a branch history-related code upon which prediction is made, and a target address of the next instruction to be fetched if the branch is predicted as taken (the next sequential address being the address to be fetched for a "not taken" prediction). When a branching instruction is fetched, its address is matched against the tags in the BTB to determine if this instruction has been previously encountered; if so, the next instruction is fetched according to the prediction code indicated in the BTB for that instruction. Newly-encountered branching instructions are statically predicted, as no history is present in the BTB. Upon execution and completion of the instruction, the BTB entry is created (typically, for taken branches only) or modified (for branches already having a BTB entry) to reflect the actual result of the branching instruction, for use in the next occurrence of the instruction.

Various conventional alternative actual prediction algorithms that predict branches based upon the most recently executed branches or upon the branching history of the same instruction, are known in the art. A well-known simple prediction algorithm follows a four-state state machine model, and uses the two most recent branch events to predict whether the next occurrence will be taken or not taken. The four states are referred to as "strongly taken", "taken", "not taken", and "strongly not taken". A "strongly" state corresponds to at least the last two branches (either generally or for the particular instruction, depending upon the implementation) having been taken or not taken, as the case may be. The taken and not taken states (i.e., not a "strongly" state) correspond to the last two branches having differing results, with the next branch result either changing the prediction to the other result, or maintaining the prediction but in a "strongly" state.

A recent advance in branch prediction algorithms uses not only branch history results, but also branch pattern information, in generating a prediction of branch behavior. For example, a certain branch instruction may be a loop of three passes, such that its branch history will repetitively follow a pattern of taken-taken-not taken. Use of a simple two-bit, or four-state, prediction mechanism will not correctly predict the branching of this instruction, even though its behavior is entirely predictable. The well-known two-level adaptive branch prediction mechanism, described in Yeh & Patt, "Two-Level Adaptive Branch Prediction", *Proceedings of the 24th International Symposium on Microarchitecture,* (ACM/IEEE, November 1991), pp. 51–61, uses both branch history and branch pattern information to predict the results of a branching instruction. Branch prediction using the Yeh & Patt approach has been applied to microprocessor architectures using BTBs, as described in U.K. Patent Application 2 285 526, published Jul. 12, 1995. Attention is also directed, in this regard, to U.S. Pat. No. 5,574,871.

According to the approach described in the above-referenced Yeh and Patt paper and U.K. Patent Application 2 285 526, a pattern history is maintained and updated for each unique branch pattern. In this approach, the pattern history consists of the four-state state machine model described above, in which the two most recent branch events for each branch pattern predicts whether the next occurrence of a branch having the same branch pattern will be taken or not taken (along with its "strongly" attribute). In operation, upon detection of a branching instruction having an entry in the BTB, the branch pattern contained in the branch history field for that instruction indexes into the pattern history table, from which the prediction is obtained. Upon resolution of the branch, both the branch history field for the particular instruction and the pattern history for its previous pattern (i.e., the branch pattern used in the prediction) are updated. The updated pattern history is then available for use in predicting the outcome of the next branch instruction having its associated branch pattern in its branch history field of the BTB. The pattern history table according to this approach is thus "global", in the sense that the branch prediction is generated for any branch instruction having the same branch history pattern, regardless of the identity of the instruction. Accordingly, the pattern history for a particular branch pattern will be defined and updated based upon the branch prediction results for any branching instruction having that branch history. The branch prediction for any given instruction will thus be determined based upon the branch results of other, dissimilar, instructions, according to this basic two-level technique.

As described in Yeh and Patt, "Alternative Implementations of Two-Level Adaptive Branch Prediction", *Conference Proceedings of the 19th Annual International Symposium on Computer Architecture*, (ACM, May 1992), pp. 124–134, an alternative implementation of two-level branch prediction addresses this limitation. This alternative implementation provides address-specific pattern history tables, such that each entry in the BTB has its own pattern history table, as shown in FIG. 3 of this paper. Accordingly, the branch prediction for a branching instruction is made based upon the pattern history as generated and modified by its own past history, and is not dependent upon the branch results for other branching instructions having similar branch patterns.

While the use of address-specific pattern history tables eliminates interference in the branch prediction from other branching instructions having the same branch patterns, the cost of implementation can be quite substantial. For example, modem microprocessors may have BTBs with up to as many as 4 k entries. The use of an index of four bits of branch history into address-specific pattern history tables thus requires 4 k pattern history tables, each with sixteen entries that are two bits in width, resulting in 128 kbits of storage. The chip area required for implementation of this approach is thus quite substantial. This cost rapidly increases, however, as branch prediction is sought to be improved through the use of additional branch history bits as the index to the pattern history tables; for example, the use of six branch history bits would require 512 kbits of pattern history storage. As microprocessors continue to have more pipelines, each deeper in stages, resulting in more severe penalties for branch misprediction and thus a higher premium on accurate branch prediction, the cost of implementing address-specific pattern history tables becomes even greater.

By way of further background, it has been observed that microprocessor programs of different types have similarities in branch behavior within the type, and dissimilarities across types. For example, as described in Calder and Grunwald, "The Predictability of Branches in Libraries", *Proceedings of the 28th International Symposium on Microarchitecture* (ACM/IEEE, November 1995), pp. 24–34, commonly used UNIX library subroutines tend to have predictable branching behavior and, as a class or type, different branching behavior from non-library programs.

By way of further background, indexing into a global pattern history table using both branch history and a portion of the tag field of the BTB is known.

By way of further background, modern microprocessors are now capable of supporting multitasking operating systems, in which the microprocessor sequentially switches its operation among several tasks to give the appearance of the parallel operation of multiple tasks. Typically, for example in microprocessors constructed according to the well-known x86 architecture, each task is carried out for a short time and is then interrupted by an event commonly referred to as a task switch, after which a different task is started or restarted and then executed for a short time, with the sequence continuing with additional task switches. In order to carry out such multitasking operation, the system context for each task must be saved upon interruption of the task, and restored upon restarting of the task. Portions of memory are typically reserved and used for storage and recall of the system context for each task. According to the x86 architecture, system segments referred to as the task state segment (TSS) are assigned to each task, for storage of its condition when interrupted by a task switch.

BRIEF SUMMARY OF THE INVENTION

It is therefore an object of the present invention to provide branch prediction in a microprocessor that is based upon program type.

It is a further object of the present invention to provide such branch prediction in which branch pattern history tables are maintained for each task, such that branch activity in an active task does not disturb the branch pattern history of interrupted tasks.

Other objects and advantages of the present invention will be apparent to those of ordinary skill in the art having reference to the following specification together with its drawings.

The present invention may be implemented into a microprocessor by providing one or more dynamically reloadable pattern history tables in a multitasking microprocessor. Each task performed by the microprocessor maintains a state segment in memory for storing the condition of an interrupted task so that, upon restart of the task, the condition of its operation may be retrieved. The present invention may be implemented by storing the contents of a pattern history table in the task state segment for the interrupted task at a task switch; upon a task switch that restarts the task, the pattern history table is reloaded with the stored contents from the task state segment.

BRIEF DESCRIPTION OF THE SEVERAL VIEWS OF THE DRAWING

FIG. 2 is an electrical diagram, in block form, of the fetch unit in the microprocessor of FIG. 1 according to the preferred embodiments of the invention.

FIG. 4 is a memory map illustrating the arrangement of a task state segment according to the preferred embodiment of the invention.

FIG. 5 is a flow chart illustrating a portion of a task switch routine according to the preferred embodiment of the invention.

DETAILED DESCRIPTION OF THE INVENTION

Figure 1:
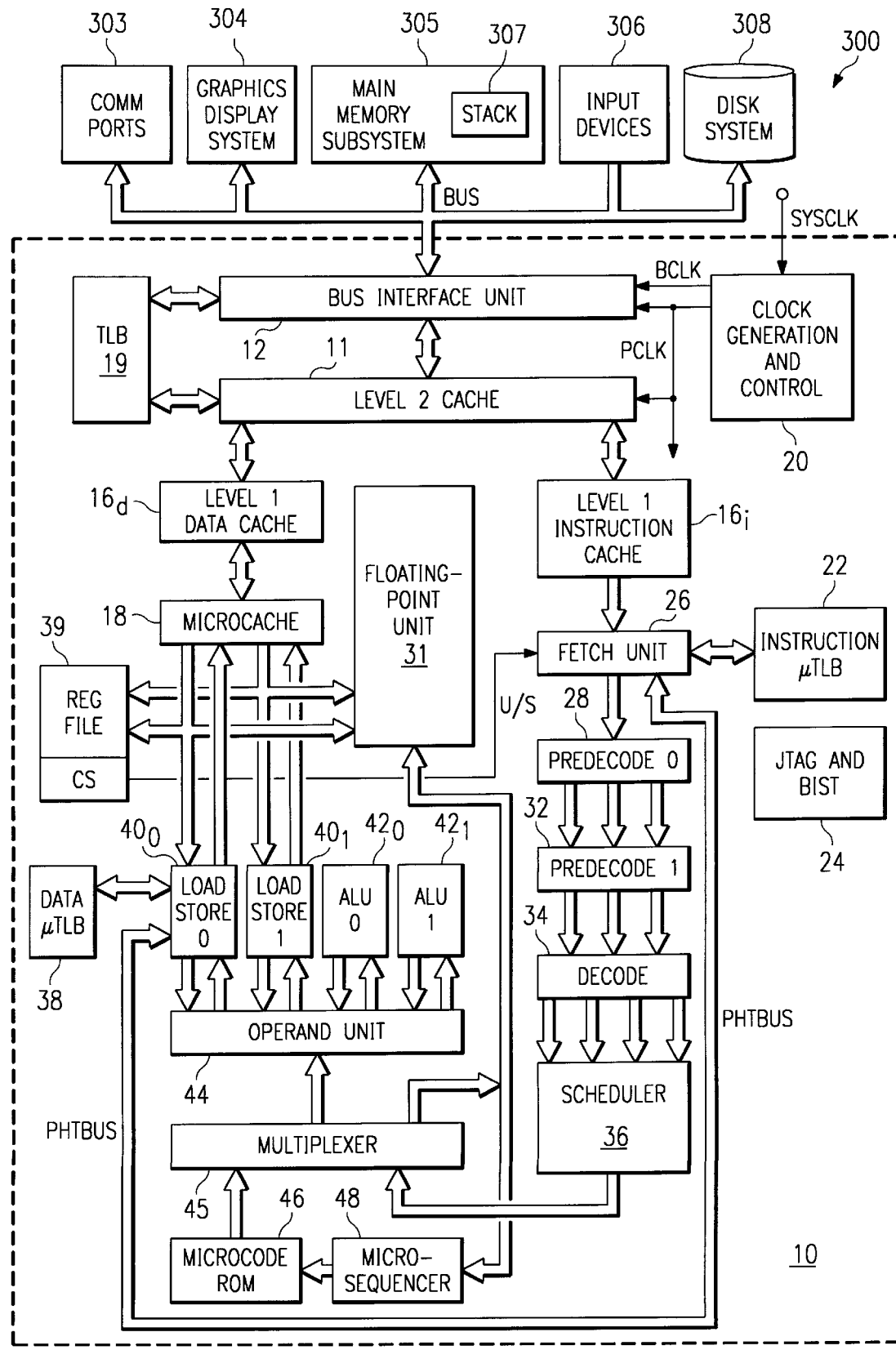
FIG. 1 is an electrical diagram, in block form, of a microprocessor and system constructed according to the preferred embodiments of the invention.

Referring now to FIG. 1, an exemplary data processing system 300, including an exemplary superscalar pipelined microprocessor 10 within which the preferred embodiment of the invention is implemented, will be described. It is to be understood that the architecture of system 300 and of microprocessor 10 is described herein by way of example only, as it is contemplated that the present invention may be utilized in microprocessors of various architectures. It is therefore contemplated that one of ordinary skill in the art, having reference to this specification, will be readily able to implement the present invention in such other microprocessor architectures. It is further contemplated that the present invention may be realized in single-chip microprocessors and microcomputers or in multiple-chip implementations, with the manufacture of such integrated circuits accomplished according to silicon substrate, silicon-on-insulator, gallium arsenide, and other manufacturing technologies, and using MOS, CMOS, bipolar, BiCMOS, or other device implementations.

Microprocessor 10, as shown in FIG. 1, is connected to other system devices by way of external bus BUS. While external bus BUS, in this example, is shown as a single bus, it is of course contemplated that external bus BUS may represent multiple buses having different speeds and protocols, as is known in conventional computers utilizing the PCI local bus architecture. System 300 contains such conventional subsystems as communication ports 303 (including modem ports and modems, network interfaces, and the like), graphics display system 304 (including video memory, video processors, a graphics monitor), main memory system 305 which is typically implemented by way of dynamic random access memory (DRAM) and which may include memory stack 307, input devices 306 (including keyboard, a pointing device, and the interface circuitry therefor), and disk system 308 (which may include hard disk drives, floppy disk drives, and CD-ROM drives). It is therefore contemplated that system 300 of FIG. 1 corresponds to a conventional desktop computer or workstation, as are now common in the art. Of course, other system implementations of microprocessor 10 can also benefit from the present invention, as will be recognized by those of ordinary skill in the art.

Microprocessor 10 includes bus interface unit (BIU) 12 connected to external bus BUS, which controls and effects communication between microprocessor 10 and the other elements in a system 300. BIU 12 includes the appropriate control and clock circuitry to perform this function, including write buffers for increasing the speed of operation, and including timing circuitry so as to synchronize the results of internal microprocessor operation with bus BUS timing constraints. Microprocessor 10 also includes clock generation and control circuitry 20 which generates clock phases based upon system clock SYSCLK; in this example, clock generation and control circuitry 20 generates bus clock BCLK and core clock PCLK from system clock SYSCLK.

As is evident in FIG. 1, microprocessor 10 has three levels of internal cache memory, with the highest of these as level 2 cache 11, which is connected to BIU 12 by way of an internal bus. In this example, level 2 cache 11 is a unified cache, and is configured to receive all cacheable data and cacheable instructions from bus BUS via BIU 12, such that much of the bus traffic presented by microprocessor 10 is accomplished via level 2 cache 11. Microprocessor 10 may also effect bus traffic around cache 11, by treating certain bus reads and writes as "not cacheable". Level 2 cache 11, as shown in FIG. 2, is connected to two level 1 caches 16; level 1 data cache $16_d$ is dedicated to data, while level 1 instruction cache $16_i$ is dedicated to instructions. Microcache 18 is a fully dual-ported level 0 data cache, in this example. Main translation look-aside buffer (TLB) 19 controls memory accesses to level 2 cache 11 and to main memory via BIU 12, such control including the sequencing of accesses to the page tables in memory for address translation. TLB 19 also serves as a cache for the page tables. Instruction microtranslation lookaside buffer ($\mu$TLB) 22 and data microtranslation lookaside buffer ($\mu$TLB) 38 are provided to translate logical data addresses into physical addresses for accesses to level 1 instruction cache $16_i$ and level 1 data cache $16_d$, respectively, in the conventional manner.

As shown in FIG. 1, microprocessor 10 is of the superscalar type, and thus includes multiple execution units. These execution units include two ALUs $42_0$, $42_1$ for processing conditional branch, integer, and logical operations, floating-point unit (FPU) 31, two load-store units $40_0$, $40_1$, and microsequencer 48. The two load-store units 40 utilize the two ports to microcache 18, for true parallel access thereto, and also perform load and store operations to registers in register file 39. As conventional in the art, register file 39 includes general purpose registers that are available for programmer use, and also control registers including code segment register CS.

These multiple execution units are controlled by way of multiple pipelines of seven stages each, with write-back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units (including FPU 31) |
| OP | Operand: This stage retrieves the register operands indicated by the AOps |
| EX | Execute: This stage runs the execution units according to the AOps and the retrieved operands |
| WB | Write-back: This stage stores the results of the execution in registers or in memory |

Referring back to FIG. 1, the pipeline stages noted above are performed by various functional blocks within microprocessor 10. Fetch unit 26 generates instruction addresses from the instruction pointer by way of instruction microtranslation lookaside buffer ($\mu$TLB) 22, for application to level 1 instruction cache $16_i$, including according to branch prediction techniques as will be described in further detail below; in addition, as will also be described in detail below, fetch unit 26 receives signals on line U/S from code segment register CS indicating the program type, or class, of the current instruction at fetch unit 26. In addition, as will be described hereinbelow, pattern history bus PHTBUS is provided between fetch unit 26 and either or both of load/store units 40, to permit the reading and writing of one or more pattern history tables in fetch unit 26 according to the preferred embodiment of the invention, as will be described in further detail hereinbelow.

Instruction cache 16$_i$ produces a stream of instruction data to fetch unit 26, which in turn provides the instruction code to predecode 0 stage 28 and predecode 1 stage 32 in the desired sequence. These two stages operate as separate pipeline stages, and together operate to locate up to three x86 instructions and apply the same to decoder 34. Predecode 0 stage 28 determines the size and position of as many as three variable-length x86 instructions, while predecode 1 stage 32 recodes the multibyte instructions into a fixed-length format to facilitate decoding. Decode unit 34, in this example, contains four instruction decoders, each capable of receiving a fixed length x86 instruction from predecode 1 stage 32 and producing from one to three atomic operations (AOps), which are substantially equivalent to RISC instructions. Scheduler 36 reads up to four AOps from the decode queue at the output of decode unit 34, and assigns these AOps to the appropriate execution units. Operand unit 44 receives an input from scheduler 36 and also from microcode ROM 46, via multiplexer 45, and fetches register operands for use in the execution of the instructions. In addition, according to this example, operand unit 44 also performs operand forwarding to send results to registers that are ready to be stored, and also performs address generation for AOps of the load and store type.

Microsequencer 48 and microcode ROM 46 control ALUs 42 and load/store units 40 in the execution of microcode entry AOps, which are generally the last AOps to execute in a cycle. In this example, microsequencer 48 sequences through microinstructions stored in microcode ROM 46, to effect control responsive to microcoded microinstructions such as complex or rarely-used x86 instructions, x86 instructions that modify segment or control registers, handling of exceptions and interrupts, and multicycle instructions (such as REP instructions, and instructions that PUSH and POP all registers).

Microprocessor 10 also includes circuitry 24 for controlling the operation of JTAG scan testing, and of certain built-in self-test (BIST) functions, ensuring the validity of the operation of microprocessor 10 upon completion of manufacturing, and upon resets and other events.

Referring now to FIG. 2, the construction and operation of fetch unit 26 according to the preferred embodiment of the invention will now be described. As noted above, fetch unit 26 performs the function of determining the address of the next instruction to be fetched for decode. As such, fetch unit 26 determines the sequence in which instructions are loaded into the pipelines of microprocessor 10, and in this embodiment of the invention thus controls the speculative execution of addresses, particularly by way of branch prediction.

The operation of fetch unit 26 is based upon a logical fetch address FA that is generated according to one of several ways, as selected by multiplexer 52. Fetch address FA may be generated merely from the contents of fetch pointer 50 in fetch unit 26, in the case where the next sequential address is to be fetched for decoding. As shown in FIG. 2, fetch pointer 50 is a register in fetch unit 26, having an output connected to one input of multiplexer 52 and also to incrementer 51. Incrementer 51 advances the value of the fetch address to the next logical instruction (in the case of a superscalar machine, the next logical instruction is not necessarily the next sequential instruction), and applies the advanced fetch address to an input of multiplexer 58 for possible storage in fetch pointer 50 and use in the next fetch. Multiplexer 58 is provided to select the source of updated contents of fetch pointer 50 for the next access. A second way in which the fetch address FA is generated is by one of the execution units (e.g., microsequencer 48) to multiplexer 52, for example in the event of a taken branch that is not predicted by fetch unit 26, or a mispredicted branch; this value is also applied to an input of multiplexer 58, for storing in fetch pointer 50 as appropriate.

Fetch unit 26 also includes circuitry for generating the next fetch address FA out of program sequence. As shown in FIG. 2, fetch unit 26 includes return address stack 55, which is a last-in-first-out (LIFO) memory having several locations, at which return addresses for subroutine calls and subroutine returns are stored for use in speculative execution of subroutines. In this embodiment of the invention, fetch unit 26 also includes branch target buffer (BTB) 56, which is a cache-like arrangement of entries that store data indicating the prior history of branches from which the current instance of a branching instruction may be predicted, along with target addresses of branching instructions for use as the fetch address FA, so that the pipeline may be maintained in a filled condition as often as possible. In this embodiment of the invention, BTB 56 is of the two-level type, and as such operates in combination with multiple pattern history tables (PHTs) 53 for storing branch pattern history-based prediction codes that are called by branch history information. As will be described in further detail below relative to the preferred embodiment of the present invention, the appropriate one of pattern history tables 53 that is to be used in generating a branch prediction for a particular address is selected, by select logic 80, according to the type of program in which the branching instruction is contained. As illustrated in FIG. 2, select logic 80 selects from among the pattern history tables 53 in response to information regarding the type of program that contains the current branching instruction, such as communicated on line U/S which is derived from code segment register CS, and on global bit line G from the global bit of the page table entry for the corresponding branching instruction. In this manner, the branch prediction success rate is improved, by taking advantage of similarities in branch behavior exhibited by programs of the same type (e.g., application programs, shared libraries, operating system functions).

According to this embodiment of the invention, fetch unit 26 also includes PHT read/write circuitry 83, which is in communication with each of the multiple PHTs 53 and with bus PHTBUS. As will be described in further detail hereinbelow, PHT read/write circuitry 83 effects communication of the contents of a selected one of PHTs 53 to and from memory, via load/store units 40, in the event of a task switch. According to the preferred embodiment of the invention, the pattern history tables are dynamically storable and reloadable upon task switches, so that dedicated pattern history for a particular task may be maintained.

In response to branch predictions based upon corresponding prediction codes in pattern history tables 53, BTB 56 presents target instruction addresses to multiplexer 57 on bus BR TRG; return address stack 55 presents return instruction addresses to multiplexer 57 on bus RA. The output of multiplexer 57 is connected to the third input of multiplexer 52, and to multiplexer 58 so that fetch counter 50 may be updated. The three inputs to multiplexer 52 thus present three sources for the next fetch address FA, which is a logical address as opposed to a physical address.

The results of branch prediction are communicated on lines UPD from the appropriate execution unit to update logic 70. As will be described in detail below, update logic 70 updates branch history in the entries of BTB 56, and also updates the prediction codes stored in pattern history tables 53, in response to the success or failure of branch predictions, as evaluated in execution.

Fetch address FA is presented to various functions in fetch unit 26 to control the fetching of the next instruction for decoding. For example, fetch unit 26 is in communication with instruction μTLB 22, which returns a physical address PA matching the logical fetch address FA if it points to a location that has previously been translated; alternatively, the logical fetch address PA will be translated into a physical address by a main translation unit (not shown) that is external to fetch unit 26. In any event, an instruction line address IA is presented by fetch unit 26 to level 1 instruction cache $16_i$ to retrieve a line of instruction codes therefrom; of course, if a cache miss at level 1 instruction cache $16_i$ occurs, the physical address is presented to unified level 2 cache 11 and, in the event of a cache miss at that level, to main memory. In response to instruction line address IA, level 1 instruction cache $16_i$ presents a line of instruction code sequences CODE to instruction buffer and control 60 in fetch unit 26, for eventual presentation to predecode 0 stage 28. In this case, where each instruction line address IA is used to address a block of sixteen bytes, instruction buffer and control 60 has a capacity of at least sixteen bytes.

Fetch unit 26 also includes other conventional functions, such as instruction break check circuit 62 which halts additional fetching for instructions identified as breaks. Fetch unit 26 also includes a code segment limit check circuit 64, for determining whether logical fetch address FA points to an address outside the limit of the bounds of the current code segment.

Figure 3:
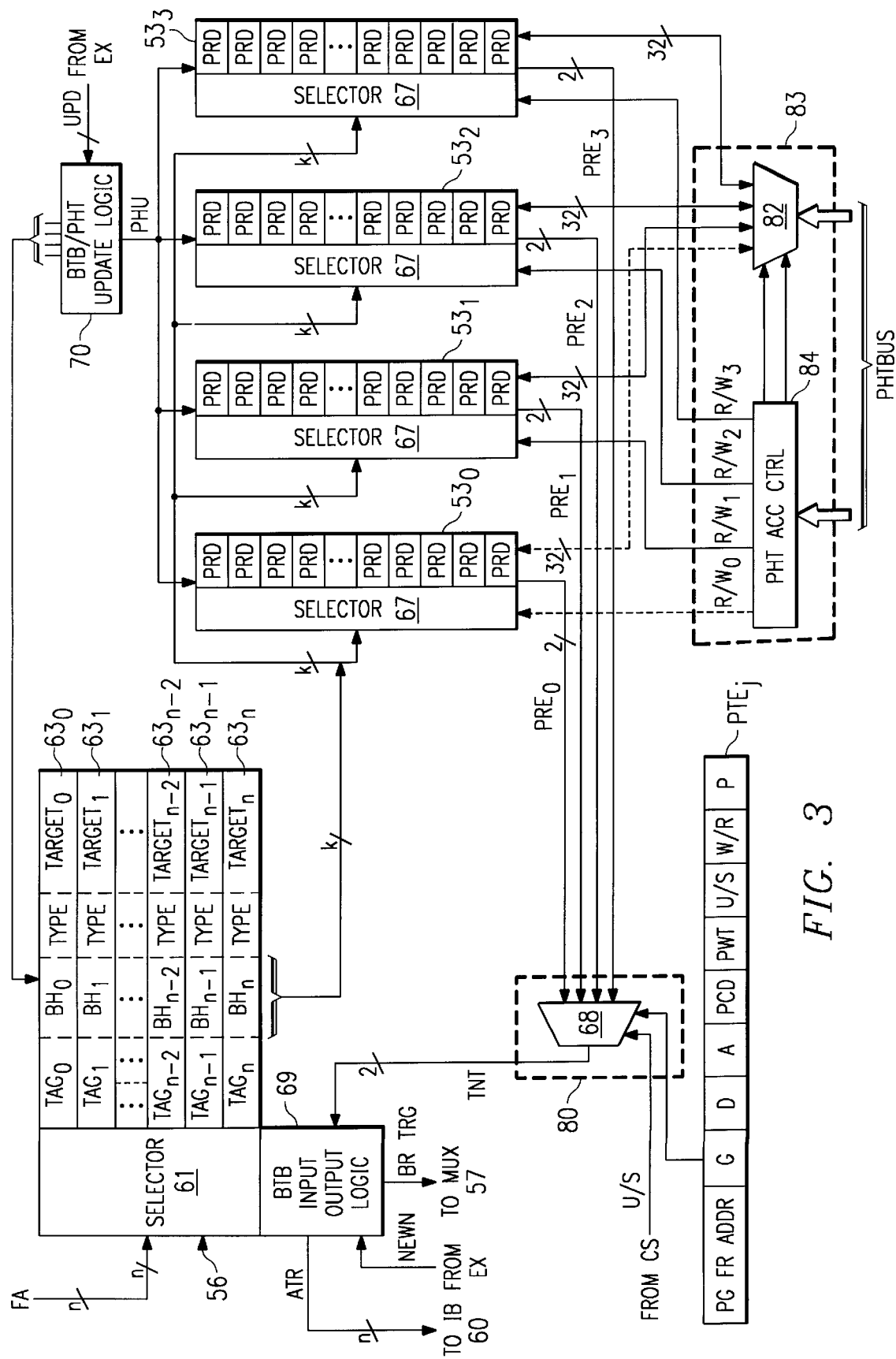
FIG. 3 is an electrical diagram, in block and schematic form, of the branch target buffer, pattern history tables, and associated circuitry in the microprocessor of FIG. 1 according to the preferred embodiment of the invention.

Logical fetch address FA is connected to an input of BTB 56, which determines whether fetch address FA points to a branch instruction that has recently been fetched, and which may have branch history stored in BTB 56 for use in speculative execution. As is known in the art, speculative execution is an important performance enhancement in deeply pipelined microprocessors such as superscalar microprocessor 10 of FIG. 1, as mispredicted branches (or pipeline stalls awaiting the results of a conditional branch) result in severe penalties, measured in lost execution opportunities. BTB 56 is a memory arranged in a cache-like configuration, for example as a 512 entry, four-way set-associative cache buffer; of course, BTB 56 may be organized in any manner from direct-mapped to fully-associative. Referring now to FIG. 3, the construction of BTB 56, in combination with an example of select logic 80 and multiple pattern history tables 53, will now be described.

As noted above, BTB 56 in this example is a four-way set-associative cache memory having multiple entries 63; only one way is illustrated in FIG. 3, for the sake of clarity. BTB 56 includes selector 61 that is coupled to receive the fetch address on lines FA, and to select the appropriate entry 63 to which the fetch address points. Selector 61 may be constructed according to any conventional technique for performing the selection of an entry 63 in BTB 56 from the fetch address, such as by way of a decoder, tag comparator, or simple multiplexer. Each entry 63 in BTB 56 has a tag field TAG used to identify it with the logical fetch address FA of a specific branching instruction, against which selector 61 compares a portion of the incoming logical fetch address FA. Tag field TAG may directly store selected bits of the logical fetch address FA of its corresponding branching instruction, or may instead correspond to a logical combination of these selected logical address bits, as is known in the art. Typically, tag field TAG will include a line address and an offset indicating the byte offset of the instruction in the fetch line. Each entry 63 in BTB 56 also has target field TARGET which contains the logical address of the branch instruction target address. The target address in portion TARGET of an entry 63 that matches a branch instruction predicted as taken will be presented by BTB input/output logic 69 to multiplexer 57 on bus BR TRG, as noted above. If the branch is not taken, merely the next sequential logical address (i.e., the contents of fetch pointer 50) will be selected by multiplexer 52 as the next logical fetch address FA.

According to this embodiment of the invention, each entry 63 also includes an m-bit branch history field BH which stores the branch history for the branching instruction corresponding to tag field TAG. The branch history stored in branch history field BH includes both the actual branch history of the associated branching instruction as determined upon completion of the execution of the instruction, and also speculative branch history consisting of the predicted result for those instances of the branching instruction which have not yet completed execution. In addition, as described in copending U.S. Provisional Application No. 60/020,844 filed Jun. 28, 1996, and incorporated herein by this reference, each entry 63 of BTB 56 may also include a counter that indicates the number of speculative branch history bits in branch history field BH, for use in recovery from a misprediction. Each entry 63 of BTB 56 also includes indicator TYPE, which describes the branch instruction type for its associated instruction (i.e., conditional branch, CALL, JUMP, or RETURN) for use in predicting the branch; unconditional branches, such as CALL, JUMP, and RETURN are predicted as always taken. Additional bits such as LRU bits, valid bit, and other control bits (not shown), are also provided in each entry 63 of BTB 56.

As noted above relative to FIG. 2, multiple pattern history tables (PHTs) 53 are used to predict the behavior of conditional branches based upon the most recent k bits of branch history field BH for the selected BTB entry 63. According to this embodiment of the invention, each PHT 53 is associated with programs of a particular type, such that the branch history field BH is able to access any one of PHTs 53, but where the prediction code is selected from only the one of PHTs 53 appropriate for programs of the type from which the instruction was fetched. While FIG. 2 illustrates that PHTs 53 are implemented as physically separate circuitry from BTB 56, it will of course be understood that PHTs 53 may be included within BTB 56, as desired. In this example, as apparent in FIG. 3, four PHTs $53_3$ through $53_0$ are implemented in combination with BTB 56.

Each PHT 53 is a simple lookup memory, each having a selector 67 that receives k branch history bits from the selected entry 63 of BTB 56 and that selects the one of its $2^k$ prediction entries PRD corresponding thereto. Selector 67 may be implemented as a decoder or a multiplexer, for performing this function. As illustrated in FIG. 3, each of PHTs $53_3$ through $53_0$ receive the k branch history bits from the selected entry 63, and present a pattern history code on a respective set of lines $PRE_3$ through $PRE_0$ corresponding to the contents of the entry PRD corresponding to the k branch history bits applied thereto. Other information may be combined with these k bits of branch history field BH, such as certain address bits and also control information, in indexing into the selected one of PHTs 53. In this embodiment of the invention, two lines are included within each set PRE, for communicating a two-bit pattern history code in the conventional manner under the four-state branch prediction model (i.e., strongly taken, taken, not taken, and strongly not taken).

According to this embodiment of the invention, select logic 80 includes circuitry for communicating the output of the selected one of PHTs 53 to be applied to BTB 56; of course, select logic 80 may be alternatively implemented to selectively address the appropriate one of multiple PHTs 53. In this example, pattern history lines $PRE_3$ through $PRE_0$ from PHTs $53_3$ through $53_0$, respectively, are applied to inputs of multiplexer 68. Multiplexer 68 selects one of the sets of pattern history lines $PRE_3$ through $PRE_0$ for application on lines TNT to BTB input/output logic 69, from which the appropriate branch prediction will be made. In this embodiment of the invention, multiplexer 68 is controlled in response to the state of a global bit G in the page table entry $PTE_j$ corresponding to the current branching instruction as will be described in further detail hereinbelow, and according to a signal on line U/S that, in this example, corresponds to the state of the current privilege level (CPL) contained in the code segment CS register of microprocessor 10, which is constructed in this example according to the x86 architecture. As will be apparent from the following description, multiplexer 68 selects the appropriate set of lines $PRE_3$ through $PRE_0$ for use in making the branch prediction, according to the type or class of program from which the branching instruction emanated, as will now be described.

According to the x86 architecture, programs executed by microprocessor 10 may be classified according to different privilege levels, from kernel (highest privilege) to applications (lowest privilege). As such, individual instructions are resident in portions of memory for which access is protected according to the various privilege levels; this operation permits certain programs and subroutines to be shared by multiple application programs operating in a multitasking environment. These portions of memory are referred to in the memory paging protection mechanism of the x86 architecture as user and supervisor levels; the user protection level (CPL=3) is assigned to those memory locations at which application programs are stored, while the supervisor protection level (CPL=0 through 2) is assigned to those memory locations at which operating system extensions, drivers, and the kernel are resident. Accordingly, the signal on line U/S which, according to this example, is based upon the value of CPL in code segment CS, and indicates the privilege level of the program containing the current branching instruction.

Of course, the type of the program with which the current branching instruction is associated may be indicated in other ways, such as by way of multiple signal lines corresponding to the CPL in an x86 architecture, or by other types of signals in microprocessors according to other architectures. In any event, multiplexer 68 is controlled according to at least one signal that corresponds to the current program type, where the branching behavior may differ for branching instructions of different types of programs. According to this preferred embodiment of the invention, BTB 56 and pattern history tables 53 are implemented to take advantage of the similarity in branching behavior for branching instructions in application programs (instructions resident in user-level memory), the similarity in branching behavior for branching instructions in the operating system (instructions resident in supervisor-level memory), and the similarity in branching behavior for instructions in shared routines of either level, along with the dissimilarity in branching behavior among branching instructions in programs of these different types. This is implemented, according to this preferred embodiment of the invention, by assigning at least one of PHTs 53 for use in connection with user-level branching instructions and at least one of the other PHTs 53 for use in connection with supervisor-level branching instructions. According to this implementation, two PHTs 53 are assigned to user-level branches and the other two PHTs are assigned to supervisor-level branching instructions. The signal on line U/S is applied to one of the control inputs of multiplexer 68 to effect such control in this embodiment of the invention.

As noted above, other control flags and bits may be used, in combination with the state of line U/S, to select the appropriate PHT 53. As is well known in the microprocessor field, and as noted above, page table entries are used to effect address translation from a logical address to a physical address; in microprocessor 10 as described above, TLB 19 serves as a cache of page table entries PTE, each of which not only include a page frame address within which the current address maps, but can also include certain control information known in the art that pertains to the page frame of memory to which the address points. As described at pages 3-21 through 3-26 of *Pentium® Pro Family Developer's Manual, Volume* 3: *Operating System Writer's Guide* Intel, 1996), incorporated herein by reference, page table entries according to the architecture of the PENTIUM PRO microprocessor include a global (page) bit G which indicates, when set, that its page entry in the translation lookaside buffer is not to be cleared upon a task switch. This permits the assignment of common pages of memory, accessible by several tasks. For example, library routines for programs in the C++ language may be stored in global memory pages, for access by multiple C++ tasks. As noted above relative to the Calder and Grunwald paper, library routines have been observed to have different branching behavior from other types of programs. Accordingly, use of the global bit in selection of the appropriate PHT 53 may be used to benefit in microprocessors having such a bit in their page table entries. According to this embodiment of the invention, the state of global bit G in page table entry $PTE_j$ (which, as described above, indicates whether its page entry is to cleared from TLB 19 upon a task switch) is forwarded to a second control input of multiplexer 68, along with the signal on line U/S from code segment CS as described above.

An example of the selection of PHTs $53_3$ through $53_0$ by multiplexer 68 according to the preferred embodiment of the invention follows the truth table:

| User/Supervisor | Global bit G state | PHT selected |
| --- | --- | --- |
| Supervisor | 0 | $53_0$ |
| Supervisor | 1 | $53_1$ |
| User | 0 | $53_2$ |
| User | 1 | $53_3$ |

While control of multiplexer 68 is effected in response to the user/supervisor state on line U/S and the state of the global bit G in the preferred embodiment of the invention, other control signals or information may be alternatively or additionally utilized in selection of the appropriate PHT 53. For example, a portion of the fetch address on lines FA may be compared against the contents of writable range registers, and the determination of whether the fetch address is within or outside of the range indicated by the range registers may be used as an identifier of program type in the selection of the appropriate one of PHTs 53. Further in the alternative, other previously unassigned bits in the page table entries PTE may be used to provide program control of the selection of the appropriate PHT 53. Still further in the alternative, this selection may be made according to the state of one or more bits within the segment descriptor DESC, which is an entry in either a global or local descriptor table indexed by the segment selector during protected mode operation of an x86 architecture microprocessor; these bits may be certain bits that are currently undefined, or may be bits resulting from extension of the segment descriptor to provide the selection code for PHTs 53. Still further in the alternative, control signals as described above may be combined with a selected subset of the fetch address itself to select the appropriate one of PHTs 53 for use in branch prediction. These and other alternative approaches to select from multiple PHTs 53 are described in detail in our provisional application No. 60/634,397, filed Dec. 10, 1996, entitled "Multiple Global Pattern History Tables for Branch Prediction in a Microprocessor" (Attorney's Docket No. TI-23791P), and incorporated herein by this reference.

Referring back to FIG. 3, the output of multiplexer 68, on line TNT, is applied to BTB input/output logic 69, as noted above. BTB input/output logic 69 presents a valid branch target address, corresponding to the TARGET portion of the current entry 63 in BTB, in the event that the prediction code on lines TNT applied thereto indicate a predicted-taken branch; BTB input/output logic 69 also will indicate on lines ATR, to instruction buffer and control 60, the corresponding branch prediction for the current instruction. In addition, BTB input/output logic 69 receives appropriate tag, target, offset, type, and history information for newly-encountered branching instructions on lines NEWN from the execution units, and writes this information into a selected entry 63 in the conventional manner. Control bits, such as LRU and the like, are used in selection of the entry 63 into which information for the new instruction is to be written, as known in the art.

BTB 56 also includes update logic 70 which receives signals on bus UPD from the execution units (e.g., ALUs 42) that indicate the results of previously predicted branching instructions. Update logic 70 is constructed in the conventional manner for circuitry to update the contents of entries 63 in BTB 56 according to whether the associated branches were successfully predicted or mispredicted. In addition, considering that PHTs 53 are adaptive in nature, update logic 70 also drives lines PHU to PHTs 53 to update, in the conventional manner, the contents of prediction code entries PRD according to the results of the prediction of executed branch instructions. According to the preferred embodiment of the invention, however, signals in lines PHU generated by update logic 70 will select the appropriate one of the multiple PHTs 53 that is to be updated for the completed branch. The adaptive updating of pattern history tables is known in the art, for example as described in the above-referenced Yeh and Patt papers.

The operation of BTB 56 in combination with the multiple global pattern history tables 53 according to the preferred embodiment of the invention will now be described relative to FIG. 3. Of course, BTB 56 is not operable for non-branching instructions fetched by addresses on lines FA. For those branching instructions that have not been recently encountered (and thus do not have a valid entry 63 in BTB 56 assigned thereto at this time), selector 61 will not find a matching tag in any of the TAG fields of entries 63, and will return a miss, or "fall-through", signal on lines ATR to instruction buffer and control 60. In this case, a valid branch target address will not be presented on bus BR TRG to multiplexer 57, and multiplexer 52 will select another source (typically fetch pointer 50) for the next logical fetch address FA. Upon completion of the execution stage for this branching instruction, BTB 56 will be updated via BTB input/output logic 69 in the conventional manner, using information provided thereto on lines NEWN so that a valid entry 63 is assigned to this branching instruction.

For unconditional branching instructions that have previously been encountered and that therefore have a corresponding entry 63 in BTB 56 (i.e., for which the portion of fetch address FA matches the TAG field of an entry 63), as indicated by the TYPE portion of its corresponding entry 63, BTB 56 will present a "taken" prediction to instruction buffer and control 60 on lines ATR, and will present the target address from the TARGET field of this entry 63 on bus BR TRG to multiplexer 57, for use by multiplexer 52 as the source of the next instruction address, in the conventional manner. In the case of subroutine RETURN instructions, which are also unconditional branching instructions, multiplexer 57 selects the appropriate return address on lines RA from return address stack 55 for application to multiplexer 52 as the source of the next instruction address, in the conventional manner.

If selector 61 of BTB 56 determines that the current fetch address on lines FA corresponds to a conditional branching instruction having a valid entry 63, BTB 56 forwards k bits of the branch history field BH of the valid entry 63 to each of PHTs $53_3$ through $53_0$. These k bits correspond to the k most recent predictions for that branching instruction, which may include only actual branch results or which may also include speculative branch predictions which have not yet been evaluated. These k bits of branch history field BH of the selected entry 63 are typically referred to as the current branch pattern for the current branching instruction. According to this preferred embodiment of the invention, selector 67 within each of PHTs $53_3$ through $53_0$, decodes these k bits to select the appropriate prediction code entry PRD matching the current branch pattern, and forwards the contents of the selected prediction code entry PRD to multiplexer 68 on its associated output lines $PRE_3$ through $PRE_0$. Each prediction code entry PRD preferably contains a two-bit code, indicating one of the four possible prediction states of taken, not taken, strongly taken, and strongly not taken.

Meanwhile, the state of global bit G in the page table entry $PTE_j$ for the corresponding portion of memory containing the branching instruction, in combination with the state of line U/S, control multiplexer 68 to select one set of output lines $PRE_3$ through $PRE_0$ for application to BTB input/output logic 69 of BTB 56 via lines TNT. As noted above, lines TNT preferably communicate a two-bit code indicating one of the taken, not taken, strongly taken, and strongly not taken prediction states. BTB input/output logic 69 then derives a prediction based upon the code on lines TNT, and forwards this prediction ("taken" or "not taken") to instruction buffer and control 60 on lines ATR. If the prediction is "taken", TARGET field of the corresponding entry 63 is presented on bus BR TRG for selection by multiplexers 57 and 52 as the next logical fetch address FA; if the prediction is "not taken", a valid target address is not presented on bus BR TRG, and multiplexer 52 is controlled to select the incremented output of fetch pointer 50 as the address for the next instruction to be fetched. Following the generation of a prediction, and in the case where BTB 56 stores speculative branch history in the branch history fields BH of entries 63, update logic 70 will then update branch history field BH in the entry 63 corresponding to the current instruction. The prediction information for the current branching instruction, along with identification information for the instruction and for the entries in BTB 56 and the appropriate PHT 53 used in generation of the prediction, will also be passed along with the instruction along the pipeline. Alternatively, a small identifier for the current branching instruction may be forwarded along the pipeline, where the identifier points to a location within a local store at or near fetch unit 26 that will be used to update BTB 56 and the appropriate one of PHTs 53.

Upon completion of the branching instruction, the appropriate execution unit will forward the actual result of the branch to update logic 70 on lines UPD. Update logic 70 then generates the appropriate signals to branch history field BH in the entry 63 of BTB 56 corresponding to the completed instruction to verify the corresponding prediction as correct or incorrect. In addition, update logic 70 updates the appropriate prediction code entry PRD in the appropriate one of PHTs 53 according to the actual results of the branch, by way of lines PHU (which necessarily include the necessary signals for selecting the proper PHT 53 and the appropriate entry PRD therein).

According to the preferred embodiment of the invention, PHTs 53 are readable and writable via bus PHTBUS, under the control of PHT read/write circuitry 83, as shown in FIG. 3. PHT read/write circuitry 83 according to this embodiment of the invention includes bidirectional multiplexer 82 and PHT access control circuit 84. Multiplexer 82 is connected on one side to bus PHTBUS, and on its other side to PHTs 53 by way of individual buses. In this example, thirty-two bit buses connect multiplexer 82 to PHTs 53 to permit communication of the entire contents of one of PHTs 53 in a single operation; alternatively, smaller buses (including two-bit buses PRE) may be used with multiple read or write cycles to communicate the contents of a selected PHT 53 to multiplexer 82, in which case a register would preferably be provided in combination with multiplexer 82 to allow placement of the entire contents of the selected PHT 53 onto data lines of bus PHTBUS.

In this example, multiplexer 82 is connected by thirty-two bit buses to each of PHTs $53_1$ through $53_3$. As described above, PHT $53_0$ is associated with programs that are of the supervisor level, but are not global in nature; as such, PHT $53_0$ is preferably not writable according to this embodiment of the invention, as branch pattern history-based prediction codes for programs of this nature are preferably maintained in BTB 56. Of course, in the alternative, PHT $53_0$ may be similarly connected to multiplexer 82, as illustrated by the dashed bus line in FIG. 3. Each of PHTs $53_1$ through $53_3$ are writable, and as such are connected to multiplexer 82 as shown in FIG. 3. It is contemplated that PHTs 532,533 are particularly suitable for being dynamically reloaded with various tasks, given the user privilege levels associated therewith. In addition, it is contemplated that PHT $53_1$ may be reloaded only in special events, as the global supervisor level programs associated therewith (typically libraries) will tend to have common branching behavior; it is particularly contemplated that the special cases in which the contents of PHT $53_1$ would be saved and reloaded will correspond to events in which the type of library routines changes among tasks (e.g., switching from a C++ task to and from a COBOL task).

PHT access control circuit 84 controls multiplexer 82 to place the data lines of bus PHTBUS in communication with the selected one of PHTs 53 to be read or written, and also controls the selected one of PHTs 53, via an associated read/write line R/W, to effect a read or write operation. The selection of PHT 53 and of whether a read or write operation is to be performed is communicated to PHT access control circuit 84 by control lines of bus PHTBUS. According to the preferred embodiment of the invention, the appropriate signal is generated by PHT access control circuit 84 on a selected one of read/write lines R/W to cause the selected PHT 53 to either communicate its entire contents to multiplexer 82, or to receive new contents therefrom, depending upon whether a read or write operation is performed. PHT access control circuit 84 also generates such appropriate handshake signals to operand unit 44 to control the communication of data on bus PHTBUS.

According to the preferred embodiment of the invention, the reading and writing of the contents of one or more of PHTs 53 is preferably performed upon a task switch. As is fundamental in the art of multitasking microprocessors, a task switch is an event in which a currently active task is interrupted in favor of another task. The interrupted task maintains all of its conditions at the time of the task switch in a portion of memory that is generally referred to in the art as a task control structure (alternative terms used in the art include task control block, and task state block). Specifically, in the x86 architecture, according to which microprocessor 10 is implemented as described above, the task control structure includes a task state segment (TSS), in which the conditions for an interrupted task are stored. The particular location of task state segments may vary, and will typically reside in main memory 305, with copies maintained in level 2 cache 11 and other caches, as appropriate during execution. At such time as the interrupted task is restarted by a later task switch, the contents of the TSS for that task are retrieved and loaded into the appropriate registers and stores of the microprocessor, and the task resumes. As is well known in the art, such multitasking operation provides the appearance of multiprocessing, despite only a single task being active at any one time.

According to the preferred embodiment of the invention, the contents of one or more of the multiple PHTs 53 may be stored in a portion of the TSS upon a task switch, and retrieved therefrom and reloaded into the corresponding PHT 53 upon a task switch that reactivates the task. In this way, microprocessor 10 according to the preferred embodiment of the invention is able to perform branch prediction in a more accurate manner, considering that branch pattern history-based branch prediction information may be maintained on a task-by-task basis.

Referring now to FIG. 4, a memory map of an example of TSS 90 according to the preferred embodiment of the invention, as associated with a particular task performed by microprocessor 10, will now be described in detail. Each task performed by microprocessor 10 will, of course, have its own TSS 90 in memory, each of TSSs 90 being arranged in the manner illustrated in FIG. 4 and described herein according to the preferred embodiment of the invention. Each word in TSS 90 is located at an offset from the TSS base address; in this example, TSS 90 occupies a thirty-word portion of memory, with offsets of up to 29 words from the TSS base address. Much of the contents of TSS 90, specifically the contents of TSS 90 at word offset 25 and below, are conventional in the art for microprocessors having the functionality of the PENTIUM microprocessor available from Intel Corporation. As illustrated in FIG. 4, TSS 90 includes the contents of the complete offset and segment registers, the ESP pointer and segment SS for stacks of different privilege levels (CPL0 through CPL2), and the saved contents of the CR3 register which stores the base address of the page directory for the task. TSS 90 also includes an I/O map base entry, which is the address of an I/O map that is used in protection of I/O address space in protected mode. The entry for back link to the prior TSS contains a segment descriptor that refers to the TSS of the prior interrupted task, when tasks are nested within one another. The T bit is a debug trap bit which, when set causes a debug exception upon a task switch. The fields of TSS 90 that are indicated as N/U are not used.

In addition to the conventional TSS entries described hereinabove, TSS 90 includes additional entries as used in the storage and retrieval of branch pattern history-based prediction information according to the preferred embodiment of the invention. These additional entries begin at word offset of 26 from the TSS base address. The lower-order portion at word offset of 26 from the TSS base address includes entry 92 that contains dynamic load control bits DLB. The number of bits DLB in entry 92 of TSS 90 correspond to the number of writable PHTs 53, such that each bit DLB is associated with one of PHTs 53. In the example of FIG. 3, where only PHTs $53_1$ through $53_3$ are writable (and PHT $53_0$ not writable), three bits DLB are provided within entry 92. As will be described in further detail hereinbelow, each bit DLB indicates whether its associated PHT 53 is to be loaded with dedicated pattern history data upon a task switch into the task associated with TSS 90. Bits DLB are typically set under instruction control by the task itself, or by the operating system, as desired.

TSS 90 also includes entries $91_1$ through $91_3$, at word offsets of 27 through 29 in TSS 90 in this example, corresponding to reloadable PHTs $53_3$ through $53_1$, respectively. Entries 91, which are thirty-two bits in size in this example, each store the contents of its associated one of the PHTs 53, in its condition upon the most recent task switch that interrupted the task associated with TSS 90. As described hereinabove, in the case where four bits of branch history index into PHTs 53 and where each PHT 53 includes sixteen entries of two bits each, thirty two bits of storage are sufficient to store the entire contents of one of PHTs 53.

Entry 94, located at the higher order portion of the word at word offset 26, contains a field corresponding to the base address of the portion of TSS 90 that contains the contents of PHTs 53. Accordingly, the base address of entries 91 is at the sum of the base address of TSS 90 and the contents of entry 94. In the example illustrated in FIG. 4, the contents of entry 94 would correspond to word offset 27. Alternatively, the location of entries 91 may be elsewhere within TSS 90; in this event, the contents of entry 94 would indicate the location of entries 91 relative to the base address of TSS 90.

Referring now to FIG. 5, the operation of a portion of a task switch routine according to the preferred embodiment of the invention will now be described. The operation of FIG. 5 is contained within a sequence of program instructions that performs the appropriate system level operations required in a task switch, including the storing of machine condition information in the TSS of the interrupted task, and reloading the machine condition from the TSS as necessary for the newly-activated task. As such, the operation of FIG. 5 is performed by control and execution circuitry in microprocessor 10, as typical for conventional operating system instruction sequences. For purposes of the following description, the interrupted task will be referred to as task i, associated with TSS $90_i$, and the newly-activated task will be referred to as task j, associated with TSS $90_j$.

The portion of the task switch process illustrated in FIG. 5 begins with decision 95, in which the state of bits DLB in TSS $90_i$ for task i that is being interrupted are interrogated. As noted above, bits DLB in TSS $90_i$ indicate, when set, that task i utilized its own branch pattern history-based prediction information in branch prediction when active, for the ones of PHTs 53 indicated by the set ones of bits DLB. As such, the current condition of the indicated PHTs 53 is to be stored in TSS $90_i$, in order to prevent the dedicated prediction information from being modified by other tasks. Accordingly, if any bits DLB in TSS $90_i$ are set (i.e., decision 95 is YES), process 96 is performed. In process 96, referring back to FIG. 3, PHT access control 84 controls multiplexer 82 to sequentially place, in communication with bus PHTBUS, those PHTs 53 indicated by the bits DLB in TSS $90_i$ that are set, and also controls selector 67 associated with the selected PHTs 53 to effect a read operation of the contents of their associated PHT 53, in a sequential manner. These contents are sequentially placed onto bus PHTBUS, and are stored (by one of load/store units 40) in memory in corresponding entries 91 of TSS $90_i$ associated with interrupted task i; generation of the addresses within TSS $90_i$ at which this information is stored is determined from the sum of the TSS base address plus the PHT area base of entry 94, as described hereinabove. Control then passes to decision 97; control also passes to decision 97 if none of bits DLB were set in TSS $90_i$ (i.e., decision 95 is NO).

Decision 97 determines the state of bits DLB in TSS $90_j$ for task j that is to be started (or restarted). The condition in which none of the bits DLB in TSS $90_j$ are set (decision 97 is NO) indicates that task j is to use the contents of PHTs 53 in their current condition; as such, control passes back to the task switch routine, without operating upon any of PHTs 53. If, on the other hand, one or more of bits DLB in TSS $90_j$ is set (decision 97 is YES), task j has its own branch pattern history-based prediction information that is to be used in branch prediction for its branching instructions. In this case, control passes to process 98.

In process 98, PHT access control circuit 84 sequentially issues write signals to selectors 67 of the ones of PHTs 53 for which bits DLB were determined as set in decision 97, synchronously with at one of load/store units 40 placing the contents of the corresponding entries 91 from TSS $90_j$ for task j, onto bus PHTBUS. In process 98, PHT access control circuit 84 and multiplexer 82 are cycled to repeat the write operation for each of PHTs 53 indicated by decision 97. In each cycle, in response to the write signal on line R/W being applied to its selector 67, the selected PHT 53 is loaded with the contents of the corresponding entry 91 of TSS $90_j$ to then contain the branch pattern history-based prediction codes that were previously stored in a task switch that interrupted task j. Since multiple PHTs 53 may be reloaded in this manner, branching instructions of different program types (e.g., application code and libraries) within the same task may be predicted based upon task-specific branch pattern history-based prediction information. Following process 98, control returns to the task switching routine as appropriate, to complete the task switch process in the conventional manner.

As a result of the operation of the preferred embodiment of the invention, therefore, branch pattern history-based prediction information may be maintained in a dedicated form for each task, with the prediction information protected from being modified by the branch performance of instructions in different tasks. In addition, according to the preferred embodiment of the invention, the storage and retrieval of the branch pattern history-based prediction information is performed automatically upon task switches, without requiring the programmer to effect the operations via program control. Improved branch prediction performance may thus be obtained from the present invention, without incurring noticeable performance degradation.

Various alternative implementations of the present invention are also contemplated. For example, while the use of multiple PHTs is preferred, the present invention may be utilized in connection with other BTB arrangements including, at one extreme, those which utilize a single global PHT, and, at the other extreme, those which provide a PHT for each BTB entry. Regarding the single PHT implementation, however, provision may be required to provide branch pattern history-based prediction information for the initial occurrence of a task, for example by storing the contents of the PHT upon a task switch to a new task, but by not overwriting the PHT contents if the task does not include sufficient information to predict a branch.

Other alternative embodiments of the invention are also contemplated. For example, particularly in architectures that do not maintain a task state segment, a pointer may be rewritten upon task switches to point to locations in memory at which the equivalent of the PHT, namely branch pattern history-based prediction information, are provided. In this example, different tasks will have different locations of their pseudo-PHTs, and simply the pointer will be rewritten upon a task switch. It is contemplated that this approach would be best handled under instruction control by the operating system.

Another alternative approach is to provide one or more PHTs in the BTB, as described hereinabove, that are available for load and store operations under program control, similar to reads and writes to the machine status register (MSR). This approach similarly is performed under instruction control via the operating system.

Furthermore, in combination with any of the above-described embodiments and alternatives, the ability to selectively enable and disable the storing and loading of branch pattern history-based prediction information on task switches may be provided. For example, an enable/disable bit may be provided in the MSR, the state of which indicates whether the operation of storing and loading prediction information is enabled or disabled. The setting and resetting of this enable/ disable bit may be effected under program control.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A microprocessor operable in a multitasking mode, comprising:

at least one execution unit for executing instructions according to first and second tasks, wherein said first and second tasks are first and second program types, respectively, executed by said microprocessor;

a memory for storing at least one instruction associated with said first task and at least one instruction associated with a second task and comprising portions associated with each of said first and second tasks; and a fetch unit, for addressing said memory to retrieve instruction codes corresponding to said first and second tasks for execution by the execution unit, comprising:

a branch history circuit, for storing a sequence of results of branching instructions executed by the execution unit;

pattern history circuitry, comprising;

a plurality of task specific pattern history tables coupled to the branch history circuit, each of said task specific pattern history tables having a plurality of indexed prediction code entries corresponding to said specific task, and each having an output for presenting the contents of one of the prediction code entries corresponding to a branch history field from the branch history circuit;

an addressing circuit for selecting an address for an instruction to be fetched; and circuitry, coupled to the pattern history circuitry and to the memory, for modifying the prediction information responsive to a task switch from the first task to the second task.

2. The microprocessor of claim 1, wherein the memory comprises first and second task control structures associated with the first and second tasks, respectively, wherein the pattern history circuitry comprises a plurality of indexed prediction code entries, and has an output for presenting the contents of one of the prediction code entries corresponding to a branch history field from the branch history circuit;

and wherein the modifying circuitry comprises:

circuitry for communicating the prediction code entries from the pattern history circuitry to the memory for storage in the first task control structure and for communicating prediction code entries from a second task control structure to the pattern history circuitry, responsive to a task switch from the first task to the second task.

3. The microprocessor of claim 2, wherein the at least one execution unit includes a load/store unit for executing loads and stores of data from and into the memory;

and wherein the communicating circuitry comprises a bus coupled to the pattern history circuitry and to the load/store unit.

4. The microprocessor of claim 2, wherein each of the task control structures comprise:

a dynamic load control bit for storing a state indicating whether prediction codes from the pattern history circuit are to be loaded from the task control structure responsive to a task switch; and memory locations for storing prediction codes from the pattern history circuit.

5. The microprocessor of claim 2, wherein the fetch unit further comprises:

select logic, coupled to receive a program type indicator, for selectively forwarding, to the addressing circuit, the output of one of the plurality of task specific pattern history tables corresponding to the program type indicator and wherein each of the task control structures comprise:

a plurality of dynamic load control bits, each for storing a state indicating whether prediction codes of an associated one of the plurality of pattern history tables are to be loaded from the task control structure responsive to a task switch; and a plurality of memory locations, each for storing prediction codes from an associated one of the plurality of pattern history tables.

6. The microprocessor of claim 2, wherein the memory comprises:
  a main memory located externally from the microprocessor; and
  a cache memory, on-chip with the microprocessor;
  wherein the task control structures are stored in main memory, and wherein the cache memory contains a copy of the task control structures.

7. The microprocessor of claim 1, wherein the branch history circuit comprises:
  a branch target buffer comprised of a plurality of entries, each entry having a tag field corresponding to the instruction address of an associated branching instruction, having a branch history field for storing a sequence of previous branches of its associated branching instruction.

8. The microprocessor of claim 7, wherein each of the plurality of entries in the branch target buffer further comprises a target field for storing a branch target address;
  wherein the fetch unit further comprises:
    select logic, coupled to receive an output of said pattern history circuitry, for selectively forwarding to said addressing circuit;
    and wherein the addressing circuit, responsive to the select logic forwarding an output corresponding to a branch-taken prediction, selects an address corresponding to the branch target address of the entry corresponding to the associated branching instruction.

9. The microprocessor of claim 1, wherein the fetch unit further comprises:
  select logic, coupled to receive a program type indicator, for selectively forwarding, to the addressing circuit, the output of one of the plurality of task specific pattern history tables corresponding to the program type indicator.

10. The microprocessor of claim 9, wherein the program type indicator of a branching instruction comprises a privilege level indicator corresponding to a program containing the branching instruction.

11. The microprocessor of claim 10, wherein the privilege level indicator comprises a bit of a code segment register corresponding to the branching instruction.

12. The microprocessor of claim 9, wherein the program type indicator of a branching instruction comprises at least one bit of a page table entry for a portion of memory containing the branching instruction.

13. A microprocessor operable in a multitasking mode, comprising:
  at least one execution unit for executing instructions according to first and second tasks;
  a memory for storing instructions and comprising portions associated with each of the first and second tasks; and
  a fetch unit, for addressing said memory to retrieve instruction codes for execution by the execution unit, comprising:
    a branch history circuit, for storing a sequence of results of branching instructions executed by the execution unit;
    pattern history circuitry, coupled to the branch history circuit, for presenting prediction information corresponding to a branch history field from the branch history circuit; and
    an addressing circuit for selecting an address for an instruction to be fetched; and
  circuitry, coupled to the pattern history circuitry and to the memory, for modifying the prediction information responsive to a task switch from the first task to the second task;
  wherein the memory comprises first and second task control structures associated with the first and second tasks, respectively,
  wherein the pattern history circuitry comprises a plurality of indexed prediction code entries, and has an output for presenting the contents of one of the prediction code entries corresponding to a branch history field from the branch history circuit;
  and wherein the modifying circuitry comprises:
    circuitry for communicating the prediction code entries from the pattern history circuitry to the memory for storage in the first task control structure and for communicating prediction code entries from a second task control structure to the pattern history circuitry, responsive to a task switch from the first task to the second task.

14. The microprocessor of claim 13, wherein the at least one execution unit includes a load/store unit for executing loads and stores of data from and into the memory;
  and wherein the communicating circuitry comprises a bus coupled to the pattern history circuitry and to the load/store unit.

15. The microprocessor of claim 13, wherein the branch history circuit comprises:
  a branch target buffer comprised of a plurality of entries, each entry having a tag field corresponding to the instruction address of an associated branching instruction, having a branch history field for storing a sequence of previous branches of its associated branching instruction.

16. The microprocessor of claim 15, wherein each of the plurality of entries in the branch target buffer further comprises a target field for storing a branch target address; wherein the fetch unit further comprises: select logic, coupled to receive an output of said pattern history circuitry, for selectively forwarding to said addressing circuit;
  and wherein the addressing circuit, responsive to the select logic forwarding an output corresponding to a branch-taken prediction, selects an address corresponding to the branch target address of the entry corresponding to the associated branching instruction.

17. The microprocessor of claim 13, wherein the pattern history circuitry comprises:
  a plurality of pattern history tables coupled to the branch history circuit, each having a plurality of indexed prediction code entries, and each having an output for presenting the contents of one of the prediction code entries corresponding to a branch history field from the branch history circuit;
  wherein the execution unit is for executing instructions according to a plurality of program types;
  and wherein the fetch unit further comprises:
    select logic, coupled to receive a program type indicator, for selectively forwarding, to the addressing circuit, the output of one of the plurality of pattern history tables corresponding to the program type indicator.

18. The microprocessor of claim 17, wherein the program type indicator of a branching instruction comprises a privilege level indicator corresponding to a program containing the branching instruction.

19. The microprocessor of claim 18, wherein the privilege level indicator comprises a bit of a code segment register corresponding to the branching instruction.

20. The microprocessor of claim 17, wherein the program type indicator of a branching instruction comprises at least one bit of a page table entry for a portion of memory containing the branching instruction.

21. The microprocessor of claim 13, wherein each of the task control structures comprise:

a dynamic load control bit for storing a state indicating whether prediction codes from the pattern history circuit are to be loaded from the task control structure responsive to a task switch; and memory locations for storing prediction codes from the pattern history circuit.

22. The microprocessor of claim 13, wherein the pattern history circuitry comprises:

a plurality of pattern history tables coupled to the branch history circuit, each having a plurality of indexed prediction code entries, and each having an output for presenting the contents of one of the prediction code entries corresponding to a branch history field from the branch history circuit;

wherein the execution unit is for executing instructions according to a plurality of program types;

wherein the fetch unit further comprises:

select logic, coupled to receive a program type indicator, for selectively forwarding, to the addressing circuit, the output of one of the plurality of pattern history tables corresponding to the program type indicator and wherein each of the task control structures comprise:

a plurality of dynamic load control bit, each for storing a state indicating whether prediction codes of an associated one of the plurality of pattern history tables are to be loaded from the task control structure responsive to a task switch; and a plurality of memory locations, each for storing prediction codes from an associated one of the plurality of pattern history tables.

23. The microprocessor of claim 13, wherein the memory comprises:

a main memory located externally from the microprocessor; and a cache memory, on-chip with the microprocessor;

wherein the task control structures are stored in main memory, and wherein the cache memory contains a copy of the task control structures.

24. A method of operating a pipelined multitasking microprocessor, comprising the steps of:

detecting a branch instruction of a first task at a fetch stage of the pipelined microprocessor;

responsive to the detecting step, retrieving at least a portion of a branch history field;

generating a branch prediction from stored prediction information corresponding to the retrieved portion of the branch history field; and responsive to a task switch from the first task to a second task, modifying the prediction information, wherein the step of generating a branch prediction comprises retrieving prediction information stored in a pattern history table corresponding to the retrieved portion of the branch history field for the detected branch instruction; and wherein the modifying step comprises:

storing prediction information from the pattern history table into a first task control structure portion of memory associated with the first task; and loading prediction information from a second task control structure portion of memory associated with the second task.

25. The method of claim 24, wherein the step of effecting a task switch further comprises:

interrogating a dynamic load bit in the first task control structure portion of memory;

and wherein the storing step is performed responsive to the dynamic load bit in the first task control structure portion of memory indicating that prediction information is to be stored in the first task control structure portion of memory.

26. The method of claim 25, wherein the step of effecting a task switch further comprises:

interrogating a dynamic load bit in the second task control structure portion of memory;

and wherein the loading step is performed responsive to the dynamic load bit in the second task control structure portion of memory indicating that prediction information is present in the second task control structure portion of memory.

27. The method of claim 24, wherein the step of generating a branch prediction is performed corresponding to the retrieved portion of the branch history field from a selected one of a plurality of pattern history tables;

wherein the step of effecting a task switch further comprises:

interrogating a plurality of dynamic load bits in the first and second task control structure portions of memory, each of the plurality of dynamic load bits associated with one of the plurality of pattern history tables;

wherein the storing step is performed responsive to one or more of the dynamic load bits in the first task control structure portion of memory indicating that prediction information is to be stored in the first task control structure portion of memory for associated ones of the plurality of pattern history tables;

and wherein the loading step is performed responsive to one or more of the dynamic load bits in the second task control structure portion of memory indicating that prediction information is present in the second task control structure portion of memory for associated ones of the plurality of pattern history tables.

28. The method of claim 24, further comprising:

determining a program type corresponding to the branch instruction; and wherein the step of generating a branch prediction is performed corresponding to the retrieved portion of the branch history field from a one of a plurality of pattern history tables selected according to the program type determined in the determining step.

29. The method of claim 28, wherein the determining step comprises:

interrogating the state of a privilege level indicator corresponding to the program containing the detected branching instruction.

30. The method of claim 29, wherein the privilege level indicator comprises a bit of a code segment register corresponding to the detected branching instruction.

31. The method of claim 28, wherein the determining step comprises:

interrogating the state of at least one bit of a page table entry for a portion of memory containing the detected branching instruction.

32. A method of operating a pipelined multitasking microprocessor, comprising the steps of:

detecting a branch instruction of a first task at a fetch stage of the pipelined microprocessor;

responsive to the detecting step, retrieving at least a portion of a branch history field;

generating a branch prediction from stored prediction information corresponding to the retrieved portion of the branch history field;

responsive to a task switch from the first task to a second task, modifying the prediction information wherein prediction information for the first and second tasks is stored in first and second portion of memory, respectively;

wherein the generating step comprises retrieving prediction information from the first portion of memory corresponding to the retrieved portion of the branch history field; and wherein the modifying step comprises:

rewriting a pointer to point to the second portion of memory so that, responsive to detecting a branching instruction in the second task, the generating step will retrieve prediction information from the second portion of memory.

\* \* \* \* \*